No. 652,214. Patented June 19, 1900.
C. R. LOUBERY.
APPARATUS FOR MEASURING CONSUMPTION OF ELECTRIC CURRENTS.
(Application filed Feb. 17, 1899.)
(No Model.) 3 Sheets—Sheet 1.

WITNESSES:

INVENTOR
César René Loubery
BY
ATTORNEY

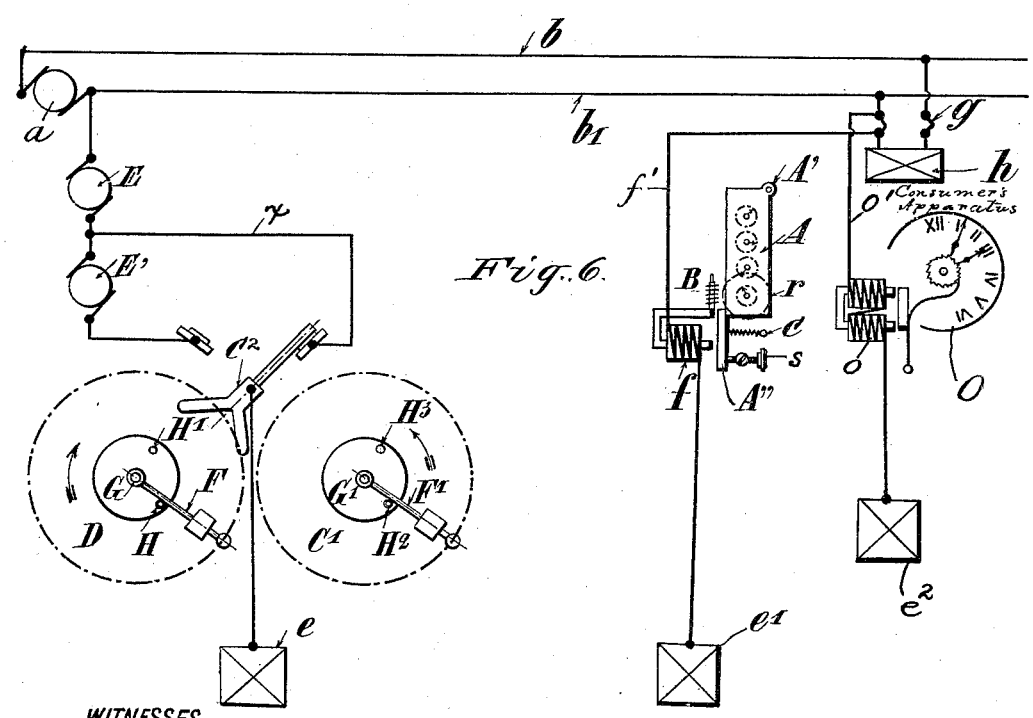

UNITED STATES PATENT OFFICE.

CÉSAR RENÉ LOUBERY, OF PARIS, FRANCE, ASSIGNOR TO HIMSELF, EMMANUEL FRANCOIS, AND HENRY KUNKELMANN, OF SAME PLACE.

APPARATUS FOR MEASURING CONSUMPTION OF ELECTRIC CURRENTS.

SPECIFICATION forming part of Letters Patent No. 652,214, dated June 19, 1900.

Application filed February 17, 1899. Serial No. 705,790. (No model.)

*To all whom it may concern:*

Be it known that I, CÉSAR RENÉ LOUBERY, a resident of Paris, in the Republic of France, have invented a new and useful Improvement in Apparatus for Measuring the Consumption of Electric Currents, which is fully set forth in the following specification.

This invention relates to improvements in means for measuring and controlling the use of electrical energy by consumers whose apparatus are connected with main supplying-conductors leading from a generating-station. It will be best understood by reference to the accompanying drawings, wherein—

Figure 1:
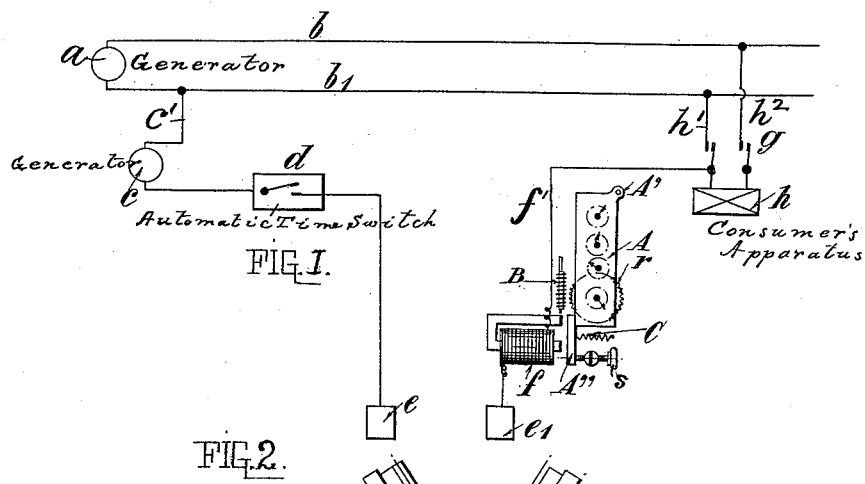
Figure 2:
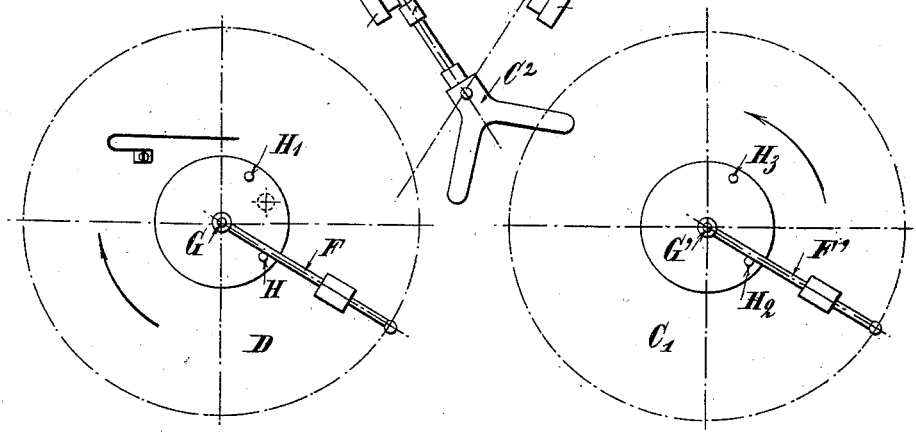
Figure 3:
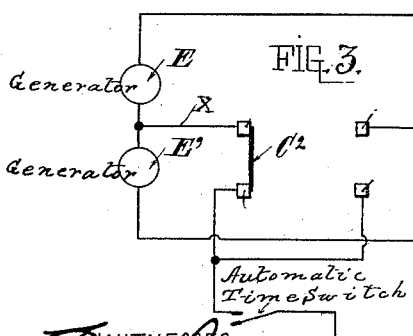
Figure 4:
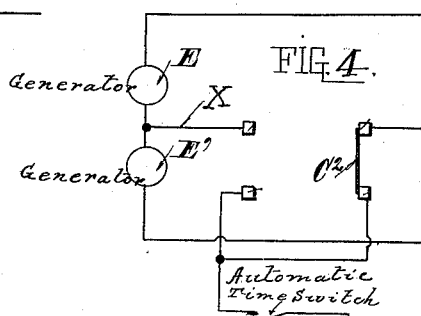
Figure 5:
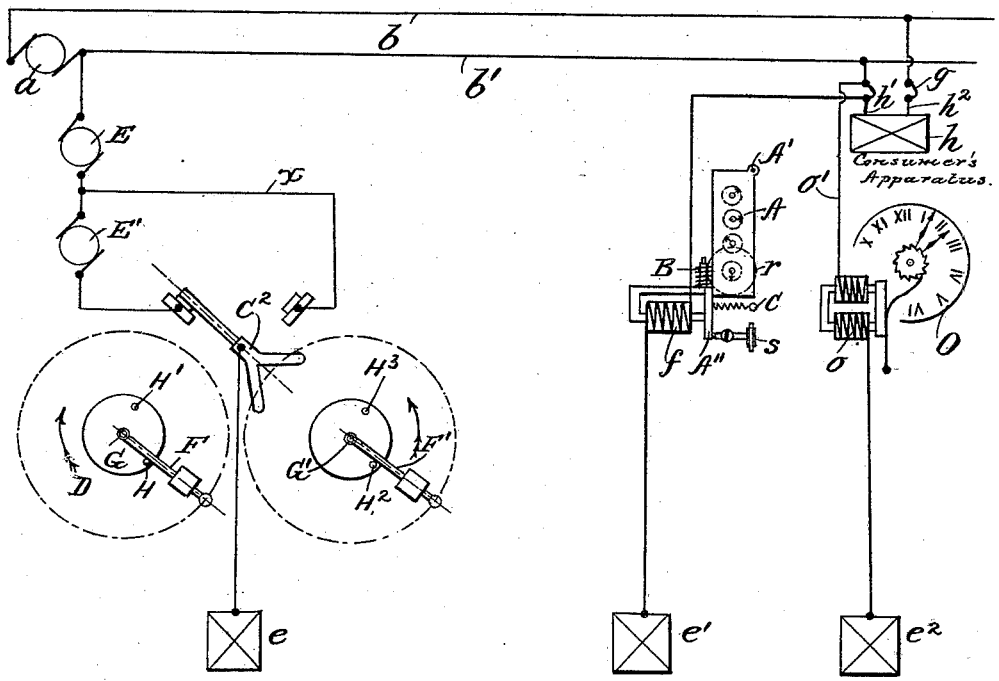

Figure 1 is a view illustrating in diagram part of a system embodying apparatus in accordance with this invention. Fig. 2 is a diagrammatic elevation illustrating an improved automatic time-switch adapted for use in the system shown in Fig. 1. Figs. 3 and 4 are diagrammatic detail views illustrating the operation of said automatic switch, and Figs. 5 and 6 are diagrammatic views illustrating the employment of the improved automatic switch in a complete system.

Referring to Fig. 1, $a$ represents a generator (of alternating current) at a central station, from which main conductors $b\ b'$ lead. A branch conductor $c'$ from the main conductor $b'$ connects with a dynamo $c$, (which generates a continuous current,) and from thence extends to the automatic time-switch or contact-maker $d$, operated by a suitable controlling-clock, (not shown,) and from this contact-maker extends to earth at $e$.

$h$ represents any suitable apparatus located at the consumer's station to which electrical energy is to be supplied. It is connected with the mains $b\ b'$, respectively, by the conductors $h'\ h^2$ through a switch $g$. From the conductor $h'$ a branch $f'$ leads through the electromagnet $f$ to the ground at $e'$. A is a plate or arm pivoted at $A'$ and carrying the dials and train of gearing constituting the registering mechanism of a meter. At its lower end plate A carries a projection or armature $A''$ and adapted when said magnet is not energized to rest against screw $s$, the spring C tending to normally maintain the parts in this position.

B is a worm continuously driven in any suitable motor mechanism. (Not shown.) It is so located as to engage one of the gear-wheels $r$ when the armature $A''$ is attracted by the electromagnet $f$.

The operation of the apparatus as thus far described is as follows: The consumer at the local station desiring to use electricity supplied by the mains $b\ b'$ closes switches $g$, and the current thereupon passes through the apparatus at $h$. The closing of the switch $g$ establishes a circuit from the ground $e$ through contact-maker $d$ and dynamo $c$ to the main conductor $b'$, from said conductor to the branch conductor of $f'$, and through the electromagnet $f$ to the ground at $e'$. From this it will be seen that if the automatic time-switch closes its contact-maker $d$, say, for example, every ten seconds, a current from the dynamo $c$ will pass through and energize the electromagnet $f$, causing the latter to attract its armature, and thereby engage the gear-wheel $r$ with the continuously-moving worm B, which latter, so long as the parts remain in this position, acts to operate the registering mechanism. The period of time during which the consumer has employed the current will thus be registered.

This apparatus is suitable for use where a fixed charge or tariff is made for the electrical energy consumed, it being understood that the operation of the apparatus is, in effect, to register the number of closures of the circuit of the generator $c$ without reference to the duration of each closure.

In Figs. 2, 3, 4, 5, and 6 I have shown an improved construction of automatic contact-maker, whereby the duration of each emission of current for operating the registering mechanism or meter, and consequently the amount registered, may be varied. It is thus possible to establish a varying rate of charge for the electrical energy consumed, according to the particular time of day at which said consumption takes place. In other words, with the construction of contact-maker about to be described it is possible to vary the operation of the registering mechanism so that at times when the electricity on the mains is least in demand the consumer may employ more electrical energy than at times when the current is most in demand without causing a corresponding increase in the amount registered. This will be more clearly understood from the description which follows. I shall now assume that the different rates of tariff or charge for the electrical energy to be consumed correspond to emissions of the current every $m$, $n$, and $p$ seconds, $m$ being greater than $n$, which is itself greater than $p$. An electrically-operated clock O at the consumer's station will be intermittently operated every time the automatic time-switch operates to make and break the auxiliary circuit, as will be more fully explained hereinafter.

D and C' are diagrammatic illustrations of clock-motors operating independently of each other to operate means for actuating a switch-arm $C^2$. The clock-motor D may be regulated so as to make a complete rotation every $m$, $n$, or $p$ seconds, according to the time of the day, while the clock-motor C' makes a complete revolution every $m$ seconds. These motors are adapted to operate a switch-arm $C^2$ in the manner about to be described. When the switch-arm $C^2$ is in one extreme position, Figs. 3 and 6, the auxiliary circuit will be closed from ground $e$, Fig. 6, through switch-arm $C^2$, continuous-current generator E, conductor $x$, line-wire $b'$, conductor $o'$, and electromagnet $o$ to earth $e^2$. The electromagnet being energized attracts its armature and operates the clock O. The voltage of generator E being too feeble by itself to energize electromagnet $f$ sufficiently to operate the register against the tension of spring C, said register remains inactive. While the switch-arm $C^2$ is in the other extreme position, Figs. 4 and 5, the auxiliary circuit will be completed from earth $e$ through the switch-arm, continuous-current generators E' and E, line-wire $b'$, and electromagnet $f$ to ground $e'$. The second generator E' having been added to generator E, the combined voltage energizes electromagnet $f$ with sufficient power to attract armature A'', and so long as the switch-arm remains in the position shown in Figs. 4 and 5 the register or meter will be operated. Switch-arm $C^2$ is alternatively moved from one position, Fig. 6, to the other, Fig. 5, it being moved to the latter position at uniform intervals of $m$ seconds. Therefore the time during every $m$ seconds which the switch-arm remains in position to effect the operation of the register depends upon whether the clock-motor D operates arm $C^2$ every $m$, $n$, or $p$ seconds.

The operation of the time-switch arm $C^2$ is effected in a sudden manner by the fall of the arms F F', mounted, respectively, on shafts G G' of the several clocks. The arm F is moved and stopped by the pins H' and H, while the arm F' is moved and stopped by the pins $H^2$ and $H^3$. Each of the arms carries a weight, which may be adjusted to the desired position and which is sufficient to cause the arm to fall with such force as to move the switch-arm $C^2$.

From the foregoing description it will be understood that the arm F' being moved to a vertical position every $m$ seconds will drop and strike the time-switch $C^2$ and will throw it to the position shown in Figs. 4 and 5, thus including both of the generators E and E' in the circuit and operating the registering mechanism at the consumers' station so long as the circuit remains thus closed. Assuming also that the arm F is brought to a vertical position every $m$ seconds and that in falling it returns the time-switch $C^2$ to the position shown in Fig. 3, it will be seen that the switch will remain in the position shown in Fig. 4 for a predetermined time during every $m$ seconds. Assuming now that the arm F is brought to a vertical position once every $n$ seconds, it will be readily understood that the switch $C^2$ will remain in the position shown in Fig. 4 for a longer time during every $m$ seconds, and, further, that if the arm F is brought to a vertical position once every $p$ seconds the time-switch will remain in the position shown in Fig. 4 for a still longer time during every $m$ seconds. In this manner it will be seen that the armature A'' will be attracted by the electromagnet $f$ for different periods of time, according to whether the arm F is being brought into operation every $m$, $n$, or $p$ seconds, and that the longer said armature is attracted by its magnet the greater will be the amount registered by the operation of the worm B upon the worm-wheel $r$.

As the actuating-armature of the clock O will be attracted by its electromagnet $o$ every time the auxiliary circuit is closed by the switch-arm $C^2$, irrespective of whether both generator E and E' or only the generator E be included in the circuit and whether the switch $g$ be open or closed, and as the switch-arm $C^2$ will be continuously operated to close and open the auxiliary circuit twice during regular and invariable time intervals (in the example given every $m$ seconds) said clock O will be thus electrically operated to accurately indicate the hour of the day, and may be consulted by the consumer, so that he will know, according to the time of day during which he is employing current, what the rate of charge therefor is.

Having now described my invention, what I claim is—

1. The combination with a main supply-circuit, of means for measuring the consumption of electric current supplied thereby, said means comprising an auxiliary circuit, means in said auxiliary circuit for causing interruptions in the current carried thereby, a registering device and continuously-driven actuating means therefor, said device being normally held out of engagement with its actuating means, and an electromagnetic device in the auxiliary circuit adapted upon each interruption of the current on said circuit to attract the registering device and hold it for a predetermined period in engagement with its actuating means.

2. The combination with a main supply-circuit and a generator therefor, of means for measuring the consumption of electric current supplied thereby, said means comprising an auxiliary circuit formed in part of one of the conductors of the supply-circuit, a generator for supplying to the auxiliary circuit a current of different character to that supplied to the supply-circuit, means in said auxiliary circuit for interrupting the current carried thereby, a registering device and continuously-driven actuating means therefor, said device being normally held out of engagement with its actuating means, and an electromagnetic device in the auxiliary circuit adapted upon each interruption of the current on said circuit to attract the registering device and hold it for a predetermined period in engagement with its actuating means.

3. The combination with a main supply-circuit, of means for measuring the consumption of electric current supplied thereby, said means comprising an auxiliary circuit, a registering device or meter associated with said auxiliary circuit, means in said auxiliary circuit for generating electric current of sufficient strength to maintain the register in operation so long as said generating means are included in the circuit, a switch for making and breaking the auxiliary circuit through said generating means, means for automatically and intermittently throwing said switch to its break position at uniform time intervals, and means for throwing said switch to its make position at uniform but variable time intervals.

4. The combination with a main supply-circuit, of means for measuring the consumption of electric current supplied thereby, said means comprising an auxiliary circuit, a registering device associated with said auxiliary circuit and adapted to be maintained in operation by current thereon, means in the auxiliary circuit for generating current sufficient to effect the operation of the register, a switch which in one position breaks the circuit through said generating means and in another position completes the same, means for automatically and intermittently throwing said switch to one position at regular time intervals, and means for automatically and intermittently throwing said switch to the other position at regular but variable time intervals.

5. The combination with a main supply-circuit, including a generator of electricity, of a consumer's apparatus adapted to be connected in said supply-circuit, an auxiliary circuit extending from the generating-station to the consumer's station and formed in part of one of the conductors of the supply-circuit, a registering device or meter associated with the auxiliary circuit, a continuously-driven actuating means for operating said registering device, electromagnetic means in the auxiliary circuit for bringing the continuously-driven part and the registering device into engagement with each other, means in the auxiliary circuit at the generating-station for supplying the auxiliary circuit with current of different character to that of the main supply-generator and of sufficient strength to excite the electromagnetic means to bring the register and its continuously-driven actuating means into engagement, a switch in the auxiliary circuit for opening and closing the same through said generating means, and means operating said switch automatically and intermittently, said means being adapted to be regulated to vary the duration of intermittent closure of said switch according to the time of day.

6. The combination with a metallic main supply-circuit and its generator, of a consumer's apparatus adapted to be connected with said circuit, an auxiliary circuit extending from the generating-station to the consumer's station, a register or meter at the consumer's station normally held out of operation, an electromagnetic device in the auxiliary circuit adapted to be energized to throw said register into operation, means in the auxiliary circuit for generating current of different character to that in the main circuit, and of sufficient strength to energize the electromagnetic device to throw the register into operation, a switch-arm in one position closing the auxiliary circuit through said generating means and in another position opening the same, and automatically-operating means for intermittently actuating said switch-arm to move it from one of said positions to the other, the operation of said actuating means being adapted to be varied to vary the time interval during which the switch at each intermittent movement, closes the circuit through the generating means for effecting the operation of the register.

7. The combination with a metallic main supply-circuit and its generator, of a consumer's apparatus and a switch for opening and closing the supply-circuit therethrough, an auxiliary circuit extending from the generating-station to the consumer's station and having at the latter two branches, one through which it is closed only when the consumer's switch is closed, a register or meter at the consumer's station normally held out of operation, an electromagnetic device in the switch-controlled branch of the auxiliary circuit adapted to be energized to throw said register into operation, a clock at the consumer's station having an actuating-electromagnet in the permanently-closed branch of the auxiliary circuit, two generators connected with the auxiliary circuit for generating current of different character to that of the main-circuit generator the combined strength of current of both generators being necessary to throw the register or meter into operation, while the current from one or both of said generators will operate the consumer's clock, a switch-arm at the generating-station having two contacts one for closing the auxiliary circuit through both generators, and the other for closing it through only one generator, and automatically-operating means for intermittently actuating said switch-arm to move it from one of said positions to the other, the operation of said actuating means being adapted to be varied to change the period of time during which the switch at each intermittent movement closes the circuit through the generating means for effecting the operation of the register.

In testimony whereof I have signed this specification in the presence of two subscribing witnesses.

CÉSAR RENÉ LOUBERY.

Witnesses:
EMILE LEDRET,
EDWARD P. MACLEAN.